Oct. 15, 1940.   A. D. DONNELL ET AL   2,218,022
TRANSPORTABLE STAND FOR VATS
Filed July 27, 1939

Inventors
Allan D. Donnell & Abram Miller,
By
Attorney

Patented Oct. 15, 1940

2,218,022

UNITED STATES PATENT OFFICE 2,218,022

TRANSPORTABLE STAND FOR VATS

Allan D. Donnell and Abram Miller, Waterloo, Iowa, assignors to The Rath Packing Company, Waterloo, Iowa, a corporation of Iowa Application July 27, 1939, Serial No. 286,811

1 Claim. (Cl. 248—120)

Our invention relates to improvements in transportable stands for vats and the like, and it is an object thereof to provide a rigidly connected supporting device having means thereon for limiting movement and seating firmly yet releasably any fitting body of whatever character thereupon.

Another object of our improvements is to supply fixed connections between the legs of the device and therearound to maintain the rigidity of the whole structure, whereby heavy loading thereon may be stable and not liable to escape therefrom when the conjoined load and stand are shifted about, or carried upon any vehicle adapted for transferring the device and its load from one place to another.

Another object of our improvements is to supply a rigid quadruplicate metal structure composed of medially crossing fixedly assembled body parts having their exterior parts of like shape directed downwardly stably and of the same lengths, and with rigid cross connections between these parts and therearound, constituting the whole as a rigidly united body with suitable upwardly directed stops to retain a vat between them in a stable position removably.

We have accomplished these objects by the means which are hereinafter described, claimed, and illustrated in the accompanying drawing.

It is to be understood, however, that considerable variation may be effected in the whole structure or any of its parts, without thereby departing from the principles of the invention.

Figure 1:
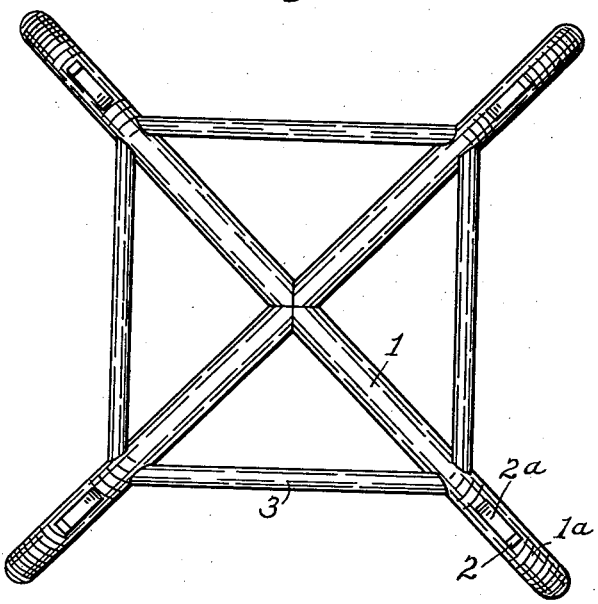
Figure 2:
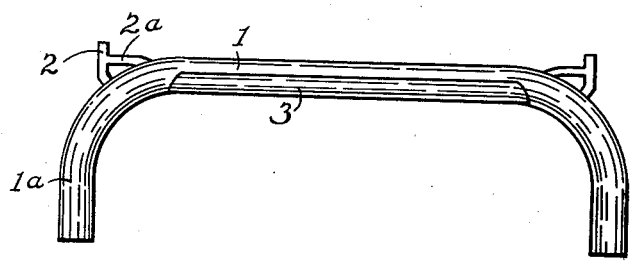

Fig. 1 is a top plan of our invention, and Fig. 2 a side elevation thereof.

Fig. 1 shows a quadruplet of limbs 1 rigidly united at their inner angularly beveled ends and brazed or otherwise united together, the terminations outwardly being preferably curved downwardly and then vertically whereby their lower ends may support a loading stably on their common upper horizontal surfaces. It is to be understood that in principle a different plurality of such limb parts may be likewise rigidly united and otherwise shaped in contour, and whether the limbs are solid or hollowed.

To evenly strengthen the construction for sustaining heavy loading or unusual lateral strains, we have supplied transverse metal braces 3 of like shape end-brazed to and connecting the pairs of legs and therearound in a quadrangle. Other means may be used than those shown, however, for such bracing and connection of the limbs at their upper parts, without departing from the invention and for light loads the connections 3 may be omitted.

As shown in both figures, an upstanding lug composed of rigid connected parts 2 and 2a is fixedly mounted preferably upon the curvate bend of each leg 1a to have the erect part 2 project a short distance above the horizontal brace member 2a, and with the upper face of each part 2a in the same horizontal plane as the plane of the upper faces of the parts 1. The erect parts 2 serve as stops against displacement of a vat or the like when the device is moved about, as in the case that a motor vehicle with projecting platform supported tiltably has the platform inserted under the crossed members 1 between the limbs 1a, so that when the platform is tilted upwardly, the device and its load may be propelled together and then unloaded.

The lugs 2—2a may be mounted for adjustments on the members 1—1a without departing from the invention, in order to fit about containers of differing diameters or sizes.

It will be seen that the structure shown as typical, is rigid throughout to withstand heavy weights or strains, and that the curvatures of the leg parts 1a are very resistant, while the body structure is relatively light but rigid against transverse blows because of the struts 3 connecting the limbs all around.

We claim:

A transportable stand for vats, consisting of crossed rigidly connected horizontal limbs whose outer parts are bent downwardly to provide legs of equal lengths, each leg having at or about its angle of downward bending an upwardly projecting rigid post extending above the level of its inner portion, and said post having below its top an inwardly projecting horizontal arm with its inner termination rigidly secured to the horizontal part of the supporting limb.

ALLAN D. DONNELL.
ABRAM MILLER.